United States Patent Office 2,911,440
Patented Nov. 3, 1959

2,911,440

EUGENOL GLYCOLIC ACID AND ISOEUGENOL GLYCOLIC ACID AMIDES

Jean Eugene Thuillier, Paris, France, and Franz Litvan and Willy Stoll, Basel, Switzerland, assignors to Geigy Chemical Corporation, New York, N.Y., a corporation of Delaware No Drawing. Application June 4, 1956
Serial No. 589,002

Claims priority, application Switzerland June 14, 1955

6 Claims. (Cl. 260—559)

The present invention is concerned with new derivatives of eugenol glycolic acid and isoeugenol glycolic acid [α-(2-methoxy-4-allyl-phenoxy)-acetic acid or α-(2-methoxy- 4-propenyl-phenoxy)-acetic acid] and the production thereof. These compounds have valuable therapeutical properties.

Eugenol and isoeugenol glycolic acid amides substituted in the amide group by hydrocarbon radicals have not been known up to now. Surprisingly it has now been found that such compounds of the general formula:

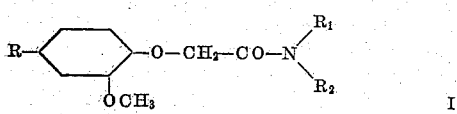

wherein R represents the allyl or propen-(1)-yl radical, $R_1$ represents an alkyl, alkenyl, cycloalkyl radical or a phenyl or benzyl radical substituted if desired by halogen, low molecular alkyl or alkoxy groups, $R_2$ represents hydrogen or an alkyl or alkenyl radical, and alkyl radicals $R_1$ and $R_2$ may also be bound to each other direct or by way of an oxygen atom, have valuable properties, in particular hypnotic, sedative, anticonvulsive and anaesthetic activity, which are of therapeutical value.

The compounds defined above can be produced by reacting eugenol or isoeugenol glycolic acid or a reactive functional derivative of these acids with a primary or secondary amine of the general formula:

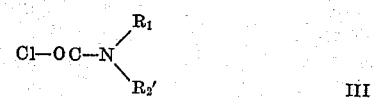

Suitable reactive functional derivatives of eugenol glycolic acid and isoeugenol glycolic acid are, for example, their halides and mixed anhydrides with low organic carboxylic acids, in particular acetic acid, as well as the esters thereof, in particular the low alkyl esters and phenyl esters. The reactions are advantageously performed in solvents or diluents. Inert organic solvents such as ether or benzene hydrocarbons on the one hand and, on the other hand water, are suitable solvents for the reactions with acid halides and anhydrides. Also alcohols can be used for the reactions with acid esters. In the reactions with acid halides or mixed anhydrides in organic solvents, an excess of the amine to be reacted or also a tertiary organic base such as pyridine or dimethylaniline can be used as acid binding agent. When the reaction is performed in water, also inorganic substances such as sodium or potassium carbonate can be used as well.

A modification of the production process defined above which is suitable for the production of N.N-disubstituted amides consists in reacting a carbaminyl chloride of the general formula:

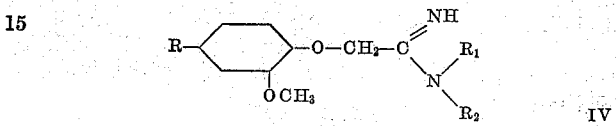

wherein $R_1$ has the meaning given above, and $R_2'$ has the meaning given above for $R_2$ with the exception of hydrogen, with a salt of eugenol or iseugenol glycolic acid, in particular an alkali salt, the reaction being performed in the warm. The desired N.N-disubstituted amides are formed while carbon dioxide is generated and the corresponding chlorides, e.g. alkali metal chlorides, are separated.

Partial hydrolysis of amidines of the general formula:

is another possibility for the production of the new amides according to the definition. The amidines themselves are obtained by methods known per se starting from eugenol glycolic acid nitrile and isoeugenol glycolic acid nitrile for example by converting these into iminoether hydrochlorides and reacting the latter with amines of the general Formula II.

Examples of starting materials of the general Formula II are: methylamine, ethylamine, n-propylamine, isopropylamine, n-butylamine, isobutylamine, sec. butylamine, n-amylamine, isoamylamine, n-hexylamine, allylamine, methallylamine, cyclopentylamine, cyclohexylamine, cycloheptylamine, benzylamine, β-phenyl-ethylamine, dimethylamine, methyl-ethylamine, diethylamine, methyl-n-propylamine, methyl-isopropylamine, di-n-propylamine, methyl-n-butylamine, methyl-isobutylamine, di-n-butylamine, di-isobutylamine, methyl-allylamine, ethyl-allylamine, diallylamine, methyl-methallylamine, dimethallylamine, N-methyl-cyclohexylamine, N-methyl-benzylamine, -p-chloro-benzylamine, -p-methoxy-benzylamine, -p-methyl-benzylamine, dibenzylamine, pyrrolidine, piperidine, 2-methyl-piperidine, morpholine and N-alkyl or N-alkenyl arylamines such as N-methyl, N-ethyl, N-n-propyl, N-isopropyl, N-n-butyl, N-isobutyl, N-sec. butyl, N-n-amyl, N-isoamyl, N-n-hexyl, N-allyl, N-crotyl, and N-methallyl aniline, -o-toluidine, -m-toluidine, p-toluidine, -3.4-dimethyl aniline, -2.4-dimethyl aniline, -2.5-dimethyl aniline, -2.6-dimethyl aniline, -mesidine, -4-ethyl aniline, -4-tert. butyl aniline, -2-chloraniline, -3-chloraniline, -4-chloraniline, -2.5-dichloraniline, -4-bromaniline, -o-anisidine, -m-anisidine, -p-anisidine and -p-phenetidine. Starting materials of the general Formula III are the carbaminyl chlorides derived from the above secondary amines.

The following examples further illustrate the production of the new compounds. Parts are given as parts by weight and their relationship to parts by volume is as that of grammes to cubic centimetres. The temperatures are in degrees centigrade.

Example 1

180 parts (=107 parts by volume) of freshly distilled thionyl chloride are gradually added to 220 parts of anhydrous eugenol glycolic acid [α-(2-methoxy-4-allyl-phenoxy)-acetic acid] in 1000 parts by volume of anhydrous benzene (acid containing crystal water can be previously dehydrated for example by distilling some hundred parts of benzene), so that the temperature does not exceed 40–50°, the reaction mixture being cooled if necessary. It is then boiled under reflux for about 30–40 minutes until no more hydrogen chloride is given off. The benzene and excess thionyl chloride are then evaporated off in the vacuum. The residue, a dark yellow oil, is the chloride of eugenol glycolic acid which can be further reacted without any processing.

240 parts of the acid chloride obtained above are dissolved in 500 parts by volume of ether and 180 parts (=260 parts by volume) of anhydrous diethylamine are slowly added while stirring and cooling. The reaction is vigorous and the diethylamine hydrochloride immediately precipitates. On completion of the addition the whole is heated for 15 minutes at 40–50°, the precipitated diethylamine hydrochloride is filtered off under suction and washed twice with 50 parts by volume of ether each time. The ethereal solution of the diethylamide is washed with 100 parts by volume of a 10% sodium carbonate solution and then with water until the reaction is neutral. The solution is then dried with calcium chloride and filtered. The ether is evaporated off whereupon about 200 parts of crude diethylamide remain which are distilled in the vacuum. About 180 parts of eugenol glycolic acid diethylamide pass over between 188–195° under 2–3 mm. pressure. The product is a pale yellow oil which is insoluble in water but soluble in the majority of organic solvents.

Example 2

24 parts of eugenol glycolic acid chloride are added dropwise while stirring and cooling to below 0° to a mixture of 40 parts by volume of 40% aqueous methylamine solution and 40 parts by volume of water and the crystal slurry obtained is stirred for some hours at room temperature. It is then filtered under suction, the residue is washed with water and dried in the vacuum. On recrystallisation from petroleum ether (B.P. about 60–80°), eugenol glycolic acid methylamide is obtained, M.P. 53–54°.

On using 30 parts of 75% ethylamine solution, eugenol glycolic acid ethylamide is obtained in an analogous manner, M.P. 59–60°.

Example 3

13 parts of n-propylamine are added dropwise while stirring and cooling with a cooling mixture to a solution of 24 parts of eugenol glycolic acid chloride in 100 parts by volume of abs. ether. On completion of the addition of the amine, the reaction mixture is boiled under reflux for about 1½ hours, it is then cooled and 100 parts of water are added. The ethereal solution is separated, washed with diluted sodium carbonate solution and water, dried and the solvent is distilled off. On recrystallising the residue from petroleum ether, eugenol glycolic acid-n-propyl amide is obtained. M.P. 44–45°.

If instead of n-propoylamine, the same amount of isopropylamine or allylamine is used, then eugenol glycolic acid isopropylamide (M.P. 44–45°) or eugenol glycolic acid allylamide (M.P. 54–55°) is obtained in an analogous manner.

Starting from 15 parts of n-butylamine, on evaporating off the ether according to the above method, a crude product is obtained from which eugenol glycolic acid-n-butylamide in a Hickmann flask passes over at 143–145° under 0.003 mm. pressure. The product solidifies into a crystal mass which melts at about 40°.

The following compounds can also be produced according to the method described in the above example by using: 20 parts of cyclohexylamine, eugenol glycolic acid cyclohexylamide (M.P. 55–56°); 23 parts of cyclohexylmethylamine, eugenol glycolic acid cyclohexylmethyl amide (M.P. 67–68°); 23 parts of N-methyl-cyclohexylamine, eugenol glycolic acid-N-methyl-cyclohexylamide (B.P.$_{0.01}$ 169–172°); 22 parts of benzylamine, eugenol glycolic acid benzylamide (M.P. 51–52°); 17 parts of piperidine, eugenol glycolic acid piperidide, a viscous oil which boils at 162–164° under 0.01 mm. pressure; 18 parts of morpholine, eugenol glycolic acid morpholide (B.P. 139–141° under 0.005 mm. pressure), which solidifies into a crystal mass after the distillation which melts at 62–64°; 15 parts of pyrrolidine, eugenol glycolic acid pyrrolidide in the form of an oil (B.P. 129–131° under 0.01 mm. pressure).

Example 4

50 parts of a 40% aqueous dimethylamine solution are diluted with 100 parts of water and 24 parts of eugenol glycolic acid chloride are added dropwise while stirring strongly and cooling to under 0°. The reaction mixture is then stirred for some hours at room temperature, diluted with the same volume of water and ethered out. The ethereal solution is washed with water, then aqueous sodium carbonate solution and again with water, dried over sodium sulphate and the ether is evaporated off. On distilling in a Hickmann flask, eugenol glycolic acid dimethylamide is obtained as a thick oil which boils at 133–135° under 0.001 mm. pressure.

If instead of the aqueous dimethylamine solution a solution of 30 parts of diethylamine in 100 parts of water is used, then by the same method, eugenol glycolic acid diethylamide which has already been described in Example 1 is obtained.

Example 5

24 parts of eugenol glycolic acid chloride and a solution as concentrated as possible of 9 parts of sodium bicarbonate are added simultaneously from two dropping funnels while cooling and stirring well to a solution of 4.5 parts of dimethylamine in 20 parts of water, the reactants being so dropped in that the addition of both finishes simultaneously. The whole is stirred for some time, ether is added, the ethereal solution is separated and washed with water and diluted sodium carbonate solution. After drying the solution over sodium sulphate and distilling off the ether, the residue is distilled in a high vacuum. Eugenol glycolic acid dimethylamide which has already been described in the previous example is obtained.

Example 6

15 parts of diethylamine are added dropwise while stirring and cooling with a cooling mixture to a solution of 24 parts of isoeugenol glycolic acid chloride in 100 parts by volume of abs. ether. The reaction mixture is then boiled under reflux for half an hour. After cooling, water is added, the ethereal phase is separated, washed with water and diluted sodium carbonate solution, dried over sodium sulphate and the ether is evaporated off. The crude isoeugenol glycolic acid diethylamide which remains is distilled from a Hickmann flask in the high vacuum. B.P.$_{0.005}$ about 140°.

If 24 parts of eugenol glycolic acid chloride and 21 parts of di-n-propylamine are used in the same way, eugenol glycolic acid-di-n-propylamide is obtained as a thick oil, B.P. 142–145° under 0.005 mm. pressure. In the analogous reaction of 24 parts of eugenol glycolic acid chloride with 26 parts of di-n-butylamine or with 15 parts of methyl-isopropylamine, eugenol glycolic acid di-n-butylamide (B.P.$_{0.001}$ 128–131°) or eugenol glycolic acid-N-methyl-isopropylamide (B.P.$_{0.001}$ 143–145°) is obtained.

In the above reactions the same amount of abs. benzene can be used instead of ether.

Example 7

About 15 parts of ethylamine are added to 25 parts of eugenol glycolic acid ethylester in 200 parts of ethanol and the whole is heated in a closed vessel for some hours at 40–50°. The solvent is then distilled off and the crude eugenol glycolic acid ethylamide is recrystallised, e.g. from petroleum ether.

Example 8

A solution of 30 parts of N-n-butyl aniline in 50 parts by volume of abs. ether is added dropwise while stirring and cooling with a cooling mixture to a solution of 24 parts of eugenol glycolic acid chloride in 150 parts by volume of abs. ether. On completion of the addition of the amine, the reaction mixture is boiled for about half an hour under reflux, cooled and then 100 parts of water are added. The ethereal solution is separated, washed with diluted hydrochloric acid, diluted sodium carbonate solution and water, dried over sodium sulphate and the solvent is distilled off. On distilling the residue, eugenol glycolic acid-N-n-butyl anilide is obtained. B.P.$_{0.0003}$ 144–147°.

The following compounds are also obtained in the manner described in the above example:

Eugenol glycolic acid-N-methyl anilide,
B.P.$_{0.003}$ 175–178°
Eugenol glycolic acid-N-ethyl anilide,
B.P.$_{0.002}$ 139–142°
Eugenol glycolic acid-N-n-propyl anilide,
B.P.$_{0.006}$ 177–178°
Eugenol glycolic acid-N-n-amyl anilide,
B.P.$_{0.0005}$ 125–130°
Eugenol glycolic acid-N-n-hexyl anilide,
B.P.$_{0.0003}$ 145–150°
Eugenol glycolic acid-N-allyl anilide,
B.P.$_{0.0005}$ 170–175°
Eugenol glycolic acid-N-methallyl anilide,
B.P.$_{0.0007}$ 165–170°
Eugenol glycolic acid-N-ethyl-o-toluidide,
B.P.$_{0.001}$ 165–167°
Eugenol glycolic acid-N-ethyl-p-toluidide,
B.P.$_{0.001}$ 173–176°
Eugenol glycolic acid-N-n-propyl-p-toluidide,
B.P.$_{0.0007}$ 167–172°
Eugenol glycolic acid-N-ethyl-3′.4′-dimethyl anilide,
B.P.$_{0.001}$ 175–180°
Eugenol glycolic acid-N-methyl-p-chloranilide,
B.P.$_{0.0005}$ 168–173°
Eugenol glycolic acid-N-ethyl-p-chloranilide,
M.P. 48–49°
Eugenol glycolic acid-N-n-propyl-p-chloranilide,
M.P. 81–82°
Eugenol glycolic acid-N-n-butyl-p-chloranilide,
M.P. 74–75°
Eugenol glycolic acid-N-ethyl-3′.4′-dichloranilide,
M.P. 70–71°
Eugenol glycolic acid-N-ethyl-p-bromanilide,
B.P.$_{0.0005}$ 175–178°
Eugenol glycolic acid-N-ethyl-p-anisidide,
B.P.$_{0.0005}$ 157–163°
Isoeugenol glycolic acid-N-ethyl anilide,
B.P.$_{0.0003}$ 148–153°
Isoeugenol glycolic acid-N-n-butyl anilide,
B.P.$_{0.001}$ 150–152°

The compounds according to the present invention produce general anaesthesia in man. For example, eugenol glycolic acid diethylamide, when administered by intravenous injection in a dosis of 2–5 mg. per kg., causes general anaesthesia. It shows a great advantage in that it does not depress the respiratory centre.

What we claim is:

1. α-(2-methoxy-4-allyl-phenoxy)-acetic acid N,N-diethylamide of the formula

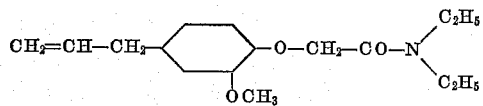

2. α-(2-methoxy-4-allyl-phenoxy)-acetic acid N-phenyl-N-n-propylamide of the formula

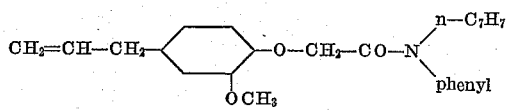

3. α-(2-methoxy-4-allyl-phenoxy)-acetic acid N-phenyl-N-n-butylamide of the formula

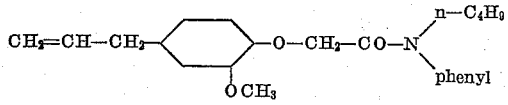

4. α-(2-methoxy-4-allyl-phenoxy)-acetic acid N-phenyl-N-allylamide of the formula

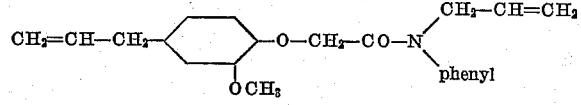

5. α-(2-methoxy-4-allyl-phenoxy)-acetic acid N-phenyl-N-methallylamide of the formula

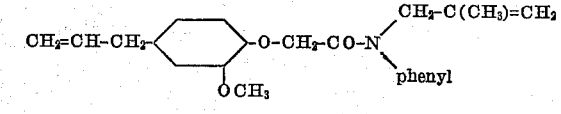

6. α-(2-methoxy-4-allyl-phenoxy)-acetic acid N-p-chlorophenyl-N-n-propyl-amide of the formula

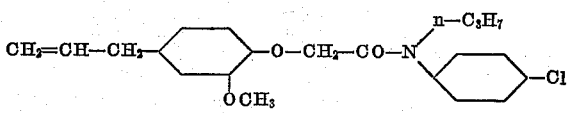

References Cited in the file of this patent

UNITED STATES PATENTS

| | | |
|---|---|---|
| 543,579 | Lederer | July 30, 1895 |
| 2,579,478 | Djerassi et al. | Dec. 25, 1951 |
| 2,790,826 | Bader | Apr. 30, 1957 |
| 2,811,507 | D'Alelio | Oct. 29, 1957 |

FOREIGN PATENTS

| | | |
|---|---|---|
| 65,393 | Germany | Apr. 12, 1892 |
| 208,255 | Germany | Aug. 8, 1907 |